United States Patent [19]
Aruga

[11] Patent Number: 5,081,551
[45] Date of Patent: Jan. 14, 1992

[54] RECORDING AND REPRODUCING APPARATUS

[75] Inventor: Tomoe Aruga, Nagano, Japan

[73] Assignee: Seiko Epson Corporation, Tokyo, Japan

[21] Appl. No.: 329,712

[22] Filed: Mar. 28, 1989

[30] Foreign Application Priority Data

| Mar. 29, 1988 | [JP] | Japan | 63-75282 |
| Mar. 29, 1988 | [JP] | Japan | 63-75283 |
| Jul. 18, 1988 | [JP] | Japan | 63-178580 |
| Nov. 16, 1988 | [JP] | Japan | 63-289101 |
| Dec. 19, 1988 | [JP] | Japan | 63-320228 |

[51] Int. Cl.$^5$ ............... G11B 5/012; G11B 17/00; G11B 33/14
[52] U.S. Cl. ............... 360/97.01; 360/97.02
[58] Field of Search ............... 360/97.01-97.04, 360/99.01, 99.08

[56] References Cited

U.S. PATENT DOCUMENTS

| 4,713,714 | 12/1987 | Gatti | 360/97.01 X |
| 4,754,397 | 6/1988 | Varaiya | 360/97.01 X |
| 4,823,213 | 4/1989 | Naruki | 360/99.08 X |
| 4,825,316 | 4/1989 | Kishi | 360/97.02 |

Primary Examiner—A. J. Heinz
Attorney, Agent, or Firm—Blum Kaplan

[57] ABSTRACT

A recording and reproducing apparatus is provided with a frame formed of plastic material. The frame can be formed as a composite, including glass fibers, polymers, carbon fibers and combinations thereof and can be electrically conductive. By supporting the functional recording and reproducing components of the apparatus on the frame which is supported in a floating state, the components are protected from external shocks and warp.

39 Claims, 10 Drawing Sheets

RECORDING AND REPRODUCING APPARATUS

BACKGROUND OF THE INVENTION

The invention relates generally to a recording and reproducing apparatus and, more particularly, to the structure of a frame for supporting the functional recording and reproducing components of the apparatus.

A conventional recording and reproducing apparatus 140 and 150, commonly referred to as a floppy disk drive (FFD), shown in FIGS. 14 and 15 have structures such as those described in Japanese Utility Model Laid-Open No. 62-73387 (1987). Apparatus 140 includes a frame 22 formed of die-cast aluminum or the like, and the main functional components for recording and reproducing are mounted on frame 22. A case 23 covers the main functional components and frame 22 and case 23 form a main body 21 of recording and reproducing apparatus 140. A pair of adapter plates 24 formed of a low rigidity material are provided and each has a pair of fixing holes 24a for securing frame 22 to a base (not shown) of, for example, a system apparatus which incorporates the recording and reproducing apparatus. Adapter plates 24 are designed to be deformable in the directions of arrows X—X, Y Y—Y and R and are secured to frame 22 by a pair of support brackets 24b mounted to both sides of a bottom portion of frame 22.

Apparatus 140 is secured to the base of a system apparatus. When there is a relative deviation of the vertical or horizontal position of fixing holes 24a from the position of the fixing holes (not shown) of the base, the adapter plates 24 deform which prevents main body 21 of recording and reproducing apparatus 140 from warping. Apparatus 140 is constructed to prevent main body 21 from warping because adapter plate 24 will deform.

Nevertheless, the low rigidity of adapter plate 24 has disadvantages. For example, plate 24 is often severely deformed when the recording and reproducing apparatus is dropped or subjected to violent vibrations, shocks or the like. This results in the dislocation of main body 21 from recording and reproducing apparatus 140. The resonance caused by the low rigidity of adapter plates 24 and the system incorporating main body 21 of recording and reproducing apparatus 140 may impair the recording and reproducing function. In addition, because frame 22 must be rigid, the weight of the recording and reproducing apparatus is disadvantageously increased.

A second example of a conventional recording and reproducing apparatus 150 is shown in FIG. 15. Apparatus 150 is constructed with a plurality of fixing holes 30a for securing recording and reproducing apparatus 150 to a base (not shown) of, for example, a system apparatus incorporating recording and reproducing apparatus 150. Fixing holes 30a are formed on both sides of a main body 30 of apparatus 150 which supports the functional components of apparatus 150.

Main body 30 of apparatus 150 is formed of a highly rigid material such as die-cast aluminum, unlike main body 20 of apparatus 140. Defects of apparatus 140 such as the dislocation of main body 20 and resonance of the system apparatus incorporating recording and reproducing apparatus 140 which are caused by an external disturbances are thereby substantially eliminated. However, the rigidity of frame 30 has drawbacks. When frame 30 is secured to a base, if there is a relative deviation of the vertical or horizontal position or direction of fixing holes 30a from that of the fixing holes (not shown) of the base, a warp is generated on main body 30 of apparatus 150, which impairs the functioning of the recording and reproducing components provided therein. In addition, the weight of the recording and reproducing apparatus is disadvantageously increased to provide a highly rigid main body 30 of recording and reproducing apparatus 150.

When a recording and reproducing apparatus is secured to a base by a fixing apparatus having low rigidity, the apparatus will resonate after it encounters an external disturbance or shock and the position of the main body of the recording and reproducing apparatus can be dislocated. This impairs the recording and reproducing function. When the fixing structure is highly rigid, misalignment of fixing holes causes the system apparatus and the main body of the recording and reproducing apparatus to repulse each other which produces a warp on the main body of the recording and reproducing apparatus. This impairs the functioning of the recording and reproducing devices provided therein.

It is also disadvantageous that the recording and reproducing apparatus is increased in weight to provide a predetermined rigidity for the main body portion, such as a frame. Recent system apparatuses incorporating recording and reproducing apparatuses such as word processors and lap-top computers are designated to be carried about and a recording and reproducing apparatus having a lighter weight is in great demand.

Accordingly, it is desirable to provide an improved structure for a recording and reproducing apparatus which avoids shortcomings of the prior art and is both light weight, inexpensive and shock resistant.

SUMMARY OF THE INVENTION

Generally speaking, in accordance with the invention, a recording and reproducing apparatus is provided in which the frame is formed of a plastic material, such as a composite, including glass fibers, polymers, carbon fibers and combinations thereof and can be electrically conductive. The functional recording and reproducing components of the apparatus are supported on a frame which is mounted in a floating position so that, the components are protected from external shocks and warp.

Accordingly, it is an object of the invention to provide a recording and reproducing apparatus that is light weight and shock proof.

Another object of the invention to provide a recording and reproducing apparatus that resists warping at positions where the main functional components are fixed to a supporting frame, caused by misaligned fixing holes.

A further object of the invention of the to provide a recording and reproducing apparatus that avoids the structural shortcomings of conventional recording and reproducing apparatus.

Still other objects and advantages of the invention will in part be obvious and will in part be apparent from the specification and drawings.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, references is had to the following description taken in connection with the accompanying drawings, in which.

DETAILED DESCRIPTION OF THE PREFERRED EMBODIMENTS

Figure 1:
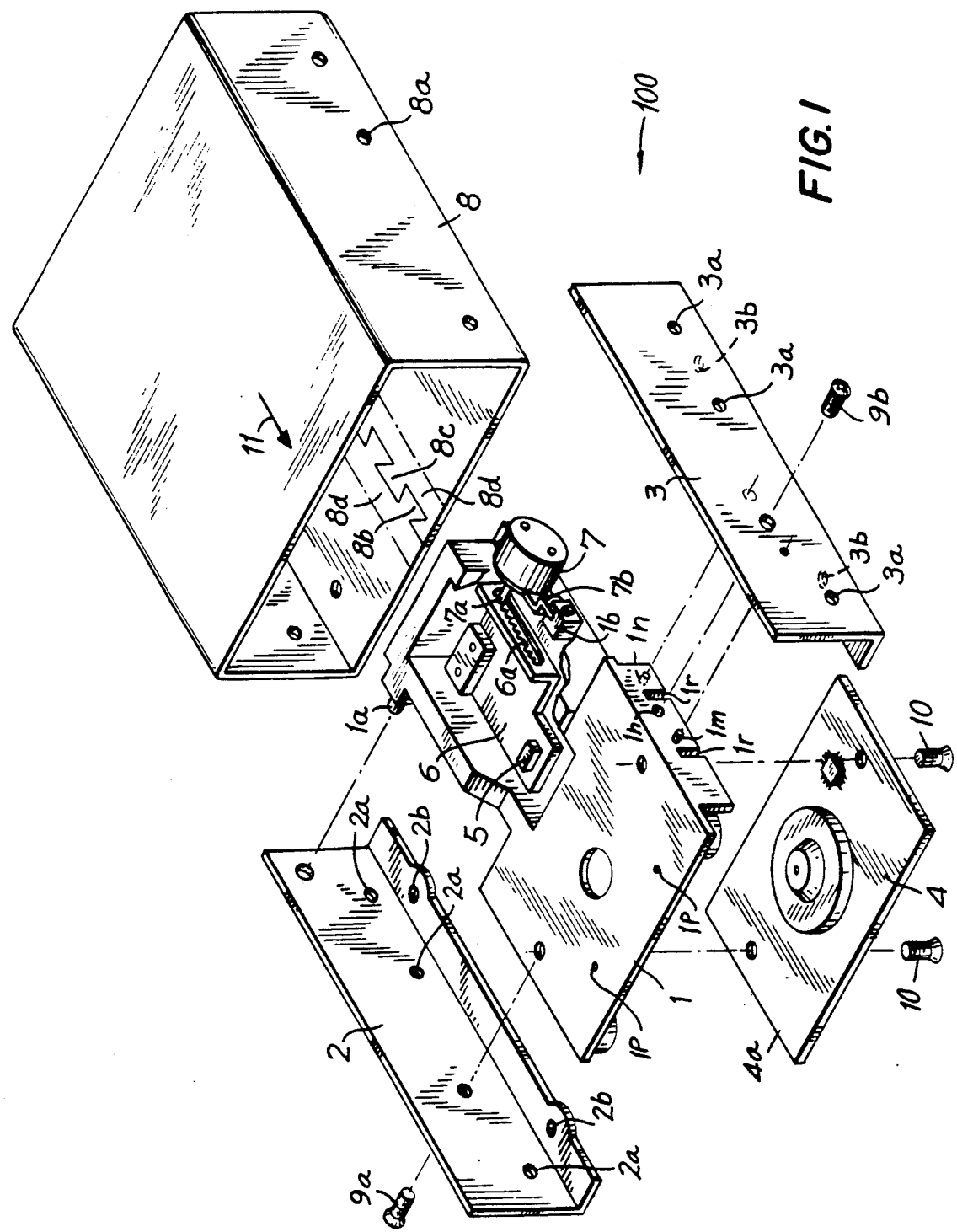
FIG. 1 is an exploded perspective view of a recording and reproducing apparatus constructed in accordance with an embodiment of the invention.

FIG. 1 illustrates a recording and reproducing apparatus 100 constructed in accordance with a first embodiment of the invention. Apparatus 100 includes a frame 1 for mounting the main functional components of the recording and reproducing device. A spindle motor 4 mounted on a spindle motor frame 4a is fixed to a frame 1 by a pair of screws 10. Motor 4 supplies a rotational driving force for chucking and rotating a disk-type recording medium (not shown). A carriage 6 is mounted on frame 1 for supporting a recording head 5 which is a signal converting device for receiving and supplying a signal to and from the recording medium. Carriage 6 can be moved freely in the radial direction of the recording medium by a guide (not shown) to insure that head 5 is accessible to the recording portions of the recording medium and is driven by a step motor 7.

A pair of side-frames 2 and 3 are disposed on frame 1 and face each other. Side-frames 2 and 3 include a plurality of fixing-screw receiving holes 2a and 3a on the respective opposite side surfaces for joining apparatus 100 to a base of a system apparatus and the like. Side-frames 2 and 3 also include a plurality of fixing-screw receiving holes 2b and 3b on the respective bottom surfaces substantially perpendicular to the opposite side surfaces. Side-frames 2 and 3 are secured to frame 1 by a pair of screws 9a and 9b, respectively, which are positioned towards the substantially horizontal center of gravity of frame 1 to support frame 1 rotatably in a "floating state".

Side-frames 2 and 3 are constructed and arranged to be outwardly resilient in opposite directions or inwardly resilient in facing directions. However, they are formed to have high rigidity in directions substantially orthogonal to the outwardly or the inwardly directions, the direction in which screws are tightened into the fixing screw receiving holes 2b and 3b, so that there is almost no elastic displacement in that direction.

Frame 1 is rotatably supported by side-frames 2 and 3 and has a slight elasticity which allows a slight twisting displacement in the rotational directions of the screws 9a and 9b at the positions at which frame 1 is coupled with side-frames 2 and 3 by screws 9a and 9b. A projection 1a is provided on frame 1 at a position spaced apart from and projects towards side-frame 2. Side-frame 2 is provided with a corresponding engagement hole 2c for engaging projection 1a. Alternatively, side-frame 3 can be provided with an engagement hole and projection 1a can be positioned on frame 1 to engage therewith. Engagement hole 2c is sized so that when projection 1a is engaged with hole 2c, there is a predetermined clearance therebetween. Projection 1a and hole 2c control the rotation of frame 1 with respect to side-frame 2.

Side-frame 2 is coupled to frame 1 by screw 9a and is slightly rotatable in the direction of screw 9a when an external stress is applied thereto. Friction from screw 9a opposes the external stress. Due to the opposing friction in the rotational direction and the relative position of side-frame 2 in the rotational direction with respect to frame 1, frame 1 pivots slightly about screw 9a as far as is permitted, due to the clearance between the engaging hole 2c of side-frame 2 and projection 1a of frame 1.

Side-frame 3 is secured to frame 1 and engages a boss 1m, provided on frame 1 in the vicinity of a screw-receiving hole 1h for screw 9b. Boss 1m insures that side-frame 3 is properly aligned with frame 1 when screw 9b secures side-frame. Although side-frames 2 and 3 of apparatus 100 are depicted as coupled to frame 1 by screws, any similar coupling method such as welding or caulking that displays a similar function can be substituted.

A case 8 having substantially the same inner dimension as the outer dimension of frame 1 joined to side-frames 2 and 3 and a substantially rectangular prismatic configuration is slid over assembled frame 1 and side-frames 2 and 3 in the direction indicated by an arrow 11. Case 8 shields and protects the main functional components for recording and reproducing.

Case 8 is provided with a plurality of holes 8a at positions corresponding to the plurality of fixing screw receiving holes 2a, 2b, 3a and 3b provided on side-frames 2 and 3, respectively. Case 8 is secured to side-frames 2 and 3 by inserting screws through holes 2b and 3b. When frame 1 is secured to a base (not shown) by screws from the base side, because case 8 is slightly elastic, it is brought into close contact with side-frames 2 and 3.

Case 8 is formed from a plate-like member, folded from both sides to yield a substantially prismatic cylindrical configuration. The region where both ends of the member meet is provided with a plurality of dovetail protrusions 8b and 8c. Dovetail end portions 8b and 8c engaged with each other in the direction of thickness so as not to slip off in the direction of length or width. End portions 8b and 8c are coupled in what is called fastener bonding and there is no gap at the juncture. When the plate-like member becomes thin after dovetail portions 8b and 8c are engaged, it is possible that the end portions can slip off in the direction of thickness.

To prevent end portions 8b and 8c from disengaging, end portions 8b and 8c may be press fit. Alternatively after the protrusions 8b and 8c are engaged, the juncture may be caulked by a pressing machine or the like. In this embodiment, a tape 8d is pasted to the juncture of fastener bonding to prevent protrusions 8b and 8c from slipping in the direction of thickness.

When recording and reproducing apparatus 100 is secured to a base, the following occurs:

1) When securing recording and reproducing apparatus 100 to a base from both sides, even if there is a relative dislocation on the surface which faces the base, the elasticity of side-frames 2 and 3 which support frame 1, allows side-frames 2 and 3 to be displaced outwardly or in inwardly from the force of screws 9a and 9b in fixing-screw receiving holes 2a and 3a. This prevents frame from warping and the main recording and reproducing components of apparatus 100 on frame 1 are not adversely affected.

2) When securing recording and reproducing apparatus 100 to a base from the bottom, while side-frames 2 and 3 pivotally support frame 1 from both sides, side-frames 2 and 3 are rigid and prevent elastic displacement in the direction in which screws are tightened into fixing-screw receiving holes 2b and 3b. However, frame 1 is slightly elastic and can be twisted slightly at the positions where frame 1 is coupled to side-frames 2 and 3 by screws 9a and 9b. When relative dislocation occurs on the surface which faces the base and the screws are tightened into fixing-screw receiving holes 2b and 3b, a warp is only locally produced on frame 1 where frame 1 is coupled to side-frame 2 by screw 9a and to side-frame 3 by screw 9b and is in engagement with boss 1m. Thus, the generation of warp is prevented at the portion of apparatus 100 at which the main functional components for recording and reproducing are mounted on frame 1.

Frame 1 also includes slits 1r near screw receiving holes 2a and 3a. Slits 1r absorb stress and further prevent localized warping of frame 1 near screws 9a and 9b from adversely influencing frame 1.

Side-frame 2 is constructed to absorb external stress in the rotational direction around screw 9a so that even when a relative dislocation is produced on a surface of apparatus 100 which faces the base (not shown) and screws are tightened in fixing-screw receiving holes 2b and 3b, warp of frame is prevented and the primary functional recording and reproducing components of apparatus 100 are not adversely affected.

Because side-frame 2 is formed to twist slightly and dissipate external stress in the rotational direction around screw 9a, it is not essential that side-frame 3 is constructed or joined to frame 1 in a way to absorb external stress. For example, boss 1m may be positioned away from screw receiving hole 1h or a second boss 1n represented by broken lines in FIG. 1 may be added to further ensure the relative position of side-frame 3 and frame 1. Alternatively, side-frame 3 may be firmly mounted to frame 1 by a plurality of screws or the like. In short, at least one of side-frames 2 and 3 should be constructed to twist and absorb external stress in the rotational direction around the screw mounting side-frame 2 or 3 to frame 1. In apparatus 100 side-frame 2 is so constructed.

Whether recording and reproducing apparatus 100 is secured to the base from both sides or from the bottom, frame 1 which supports the main functional components for recording and reproducing is rotatably secured to side-frames 2 and 3 in what is called a floating state, whereby a warp is dissipated and is not transferred to the main part of the frame 1 that supports the functional recording and reproducing components.

When recording and reproducing apparatus 100 encounters an external disturbance such as from being dropped or vibrated violently, the functional components are protected. Even when frame 1 is secured to side-frames 2 and 3 by tightening screws into fixing-screw receiving holes 2a, 3a, 2b or 3b, frame 1 is not in a substantially fixed state. However, if the recording and reproducing apparatus is dropped, violently vibrated or shocked, frame 1 will not assume a violent resonant state or cause dislocation the system formed by frame 1 and side-frames 2 and 3 because projection 1a of frame 1 engages hole 2c of side-frame 2 of apparatus 100 with a pre-determined clearance therebetween. This controls the vibration of frame 1 to a predetermined amplitude, thereby suppressing violent resonance.

Engaging hole 2c also serves as a displacement regulating mechanism for regulating the displacement of frame 1 to within the range of the clearance. For example, the clearance can be set at a necessary clearance to prevent projection 1a of frame 1 from contacting the wall defining engaging hole 2c due to a local warp produced on frame 1, or the stress relieving relative fitting action in the rotational direction around the screw 9a and 9b frame 1 when a relative dislocation is produced on the surface which faces the base and the screws are tightened into fixing-screw receiving holes 2b and 3b.

This relationship between projection 1a and engaging hole 2a of frame 1 is preferable when the rigidity of frame 1 is low and the displacement caused by external disturbances such as dropping, violent vibrations and a violent shocks is large. However, when the rigidity of the frame 1 is high and the displacement caused by external disturbance such as dropping, a violent vibration and a violent shock is small, or when the frame 1 is sufficiently supported by boss 1m (or second boss 1n) this relationship between projection 1a and engaging hole 2a is unnecessary and it is possible to simplify the structure of frame 1 so that only carriage 6 and step motor 7 are provided thereon. This would reduce the weight of and simplify construction of frame 1.

Recording and reproducing apparatus 100 differs from a conventional recording and reproducing apparatus in which the main body of the recording and reproducing apparatus is very rigid and the adapter member has a low rigidity so that the adapter member is deformed to prevent the main body of the recording and reproducing apparatus from warping. The fundamental structure of rigidity is provided by side-frames 2 and 3 and frame 1 is rotatably supported by side-frames 2 and 3 in what is called a floating state, thereby preventing warping in the portion of frame 1 on which the main functional device of the recording and reproducing apparatus is mounted.

Since frame 1 supports only the main functional device for recording and reproducing and does not contribute to the rigidity of recording and reproducing apparatus 100, frame 1 can be very simple and frail. Accordingly, frame 1 can be formed of die-cast aluminum. Preferably, it is formed of a light-weight material, such as a plastic material which provides a light weight recording and reproducing apparatus to be mounted in modern word processors or a lap-top computers which are designed to be carried about.

Side-frames 2 and 3 are rotatably secured to frame 1 by screws 9a and 9b, respectively, toward the substantially horizontal center of gravity. Frame 1 is rotatably secured in a floating state and is constructed to keep in balance and to not exert deleterious influence on the main functional device for recording and reproducing even when frame 1 encounters an external disturbance. This is an important characteristic of a recording and reproducing apparatus and it prevents the generation of relative dislocation of the standardized track position of a disk recording medium and a head for recording and reproducing data in order to guarantee the interchangeability of the data stored in the disk between different devices.

Apparatus 100 permits inclusion of a plastic frame in a recording and reproducing apparatus. This has not been achieved before due to the lack of sufficient rigidity of plastics, in spite of many attempts to reduce the weight and cost of such frames. The structure which makes the best use of the characteristics of a plastic frame is constructed as described below.

Carriage 6 supports recording head 5 for receiving and supplying a signal to and from the recording medium (not shown and hereinafter referred to as a "disk") and moves freely in the radial direction of the disk by a guide (not shown) to be accessible to all of the disk. Carriage 6 is provided with a rack 6a, positioned parallel to the radial direction of movement. Rack 6a includes a positioning pressure or preloading (not shown) and meshes with a pinion 7a on the rotational output shaft of step motor 7. Carriage 6 is driven to keep head 5 accessible to the disk in accordance with the nodal movement of step motor 7. Step motor 7 is fixed to a fixing portion 1b of frame 1 by an adapter plate 7b.

In a recording and reproducing apparatus, the recording and reproducing position in the radial direction with respect to the disk is standardized in order to guarantee the interchangeability of data. The standardized recording and reproducing position will be referred to as the "track position". It is necessary to adjust the relative positions of the track position and recording head 5 for recording and reproducing data to establish a predetermined positional relationship.

The positional relationship between the track position and recording head 5 of apparatus 100 is adjusted by providing the external body of step motor 7 with a necessary pilot pressure, rotating motor 7 and attaching it to frame 1. Carriage 6 is provided with a positioning pressure and is moved through rack 6a and meshes with pinion 7a on the rotational output shaft of step motor 7. This adjusts the relative position of the track position of the disk and head 5 to establish a predetermined positional relationship. After the adjustment, step motor 7 is fixed.

The position at which the rotational output shaft of step motor 7 is stopped is determined by the positional relationship between the stator and the rotor. With the rotation of the external body of the step motor, the rotational output shaft is rotated. When the external body of step motor 7 is rotated, pinion 7a on the rotational output shaft is also rotated, whereby carriage 6 moves through rack 6a which meshes with pinion 7a to adjust the relative position of the track position of the disk and head 5.

This method of adjusting the relative position of the track position and head 5 in which the external body of step motor 7 is rotated in the circumferential direction to adjust the linear position of head 5, enables minute positional adjustments. A mechanism which facilitates the minute adjustment of the relative position between the track position and head 5 and maintains the adjusted state without producing any dislocation is explained generally with reference to FIGS. 2 through 5.

Figure 2:
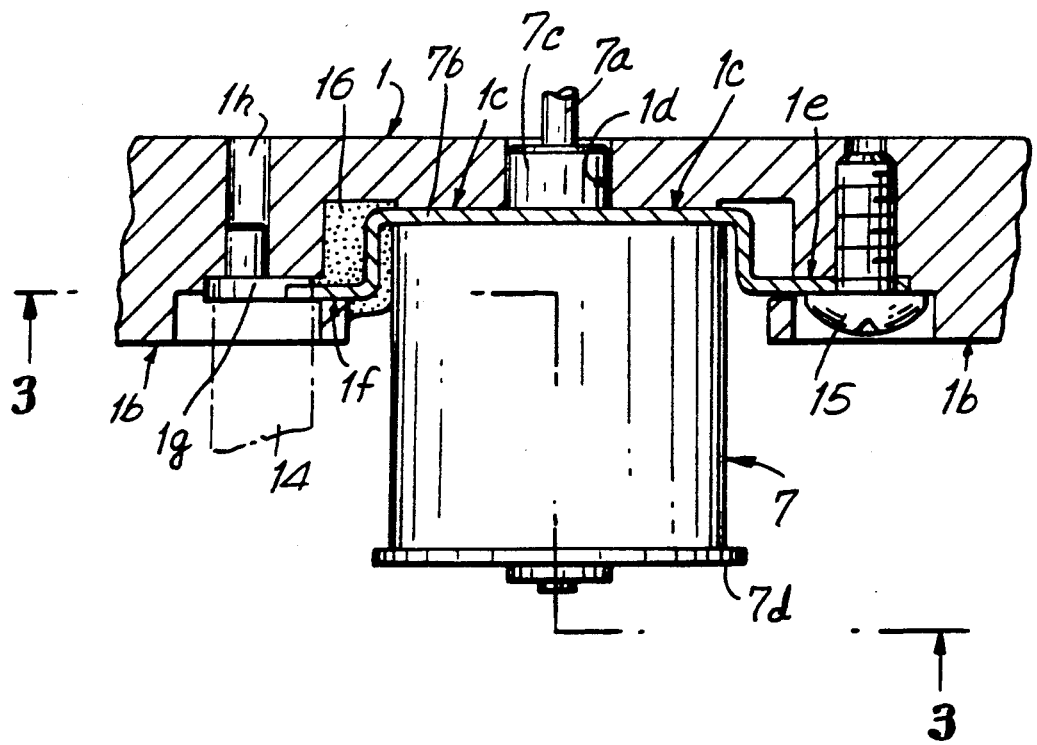
FIG. 2 is a partial sectional view of the mount for a step motor in the embodiment of FIG. 1.

FIG. 2 is a more detailed view of the mechanism for positioning head 5 of apparatus 100. The right half portion and the left half portion with a one-dot broken center line 3—3 as the center of FIG. 2 shows different positions of the same structure.

Figure 3:
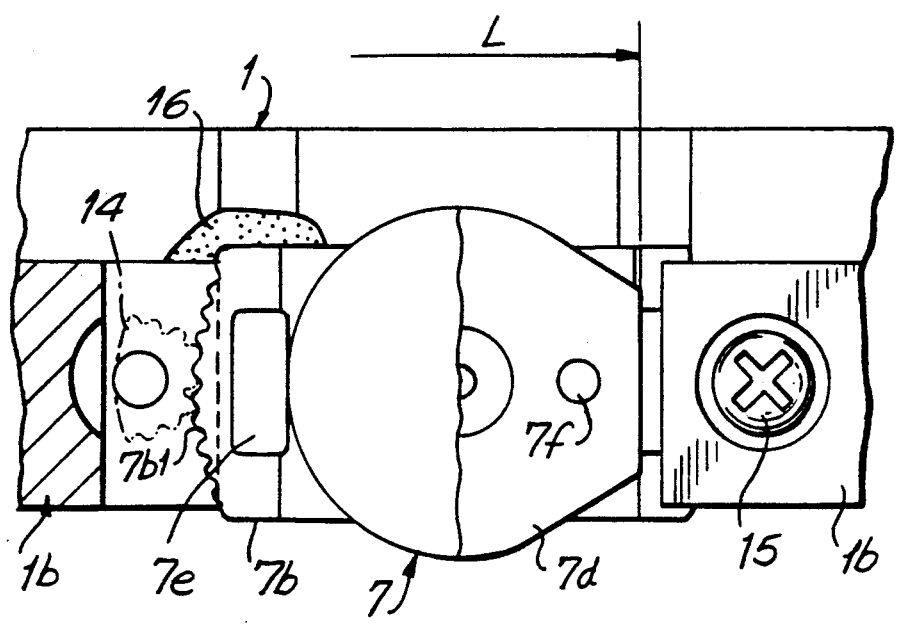
FIG. 3 is an elevational view of the main step motor guide portion of the apparatus of FIG. 1.
Figure 4:
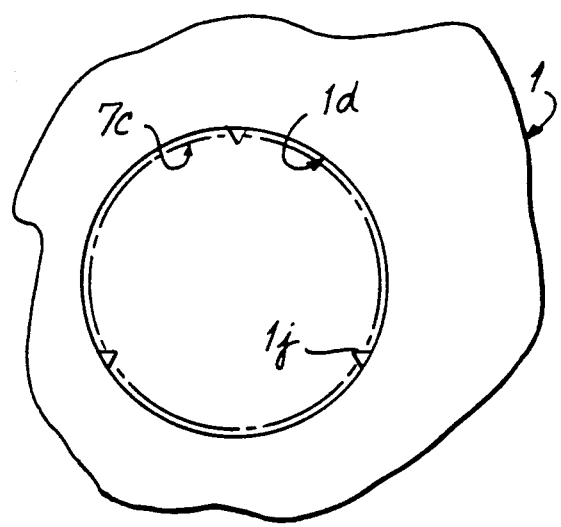
FIG. 4 is a plan view of the step motor mount of FIG. 2.
Figure 5:
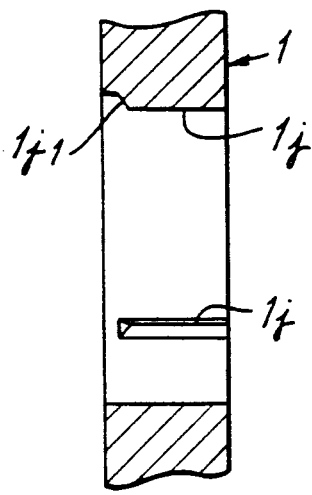
FIG. 5 is a sectional view of the mount of FIG. 4.

FIG. 3 is an elevational view of FIG. 2, showing step motor 7 secured to frame 1. The portion of the view to the right-hand side of the one-dot broken line is an elevational view of the right half portion of FIG. 2. The portion of the view to the left-hand side is a sectional view of the left-half portion of FIG. 2, taken along center line 3—3, each showing a different state from the other. FIG. 4 is an explanatory view of a portion of FIG. 2, depicting guides for step motor 7. FIG. 5 is a sectional view of the portion shown in FIG. 4, showing the structure of the guide of step motor 7. Throughout the application, similar elements are assigned the same reference numerals.

As shown in FIGS. 2 and 3, step motor 7 includes a plurality of bearings on both ends thereof in the axial direction. The bearings rotatably support a pinion (omitted in FIG. 3) provided on rotational output shaft 7a. The outer periphery of bearing 7c engages a guide hole 1d formed on frame 1 with a slight clearance therebetween and also serves as a boss acting as the reference for the position to which step motor 7 is attached.

Step motor 7 is provided with an adapter plate 7b which extends to both sides thereof and is bent substantially in the form of an inverted letter U. Adapter plate 7b includes an opening 7e positioned on the outside of the external body of step motor 7 to provide step motor 7 with the necessary positioning pressure for attaching step motor 7, and provides step motor 7 with necessary elasticity in the axial direction to provide a structure that allows elastic displacement. The size of opening 7e is set to allow for the necessary elasticity.

Frame 1 is provided with a fixing portion 1b which corresponds to a reference surface 1c of step motor 7 in the axial direction and adapter plate 7b. Fixing portion 1b includes a slit 1g having a slightly larger width than adapter plate 7b. Adapter plate 7b engages slit 1g and is pressed by a pressing surface 1f to press step motor 7 against reference surface 1c with a necessary elastic displacement.

To set step motor 7 in place and engage adapter plate 7b to fixing portion 1b, boss 7c is inserted into guide hole 1d and step motor 7 is rotated by about 90 degrees from the position of the adapter plate 7b shown in FIG. 3. Step motor 7 is then rotated into the position shown in FIG. 3 to engage adapter plate 7b with a pressing surface 1f. Adapter plate 7b is formed to allow elastic displacement to provide the necessary elasticity when step motor 7 is rotated to engage pressing surface 1f with adapter plate 7b. Either pressing surface 1f or adapter plate 7b is preferably provided with an inclined surface (not shown) for guiding the engagement.

The structure for fixing step motor 7 in position will now be described.

Adapter plate 7b is secured to frame 1 by applying an adhesive 16 between frame 1 and plate 7b. Step motor 7 is pressed against reference surface 1c with the necessary elastic displacement and adapter plate 7b is pressed in place by pressing surface 1f as shown on the left side of the one-dot broken line in FIGS. 2 and 3. Adapter plate 7b has a sufficient strength for holding step motor 7 in place properly.

Step motor 7 is fixed to frame 1 by securing a screw 15 as shown on the right side of FIGS. 2 and 3. Adapter plate 7b is screwed to a pressing surface 1e and step motor 7 is pressed against the reference surface 1c with the necessary elastic displacement while adapter plate 7b is pressed by pressing surface 1f with the necessary elastic displacement. By tightening screw 15, adapter plate 7b is pressed against a receiving surface 1e of frame 1 with only slight elastic displacement, which does not exert any influence on the function and the positional accuracy of the step motor 7. As shown on the left side of the one-dot broken line of FIGS. 2 and 3, the step motor 7 is fixed by applying adhesive 16, and on the right side, step motor 7 is fixed by screw 15. However, these fixing means may be exchanged or the same fixing means may be used on both sides.

The following are examples of suitable mechanisms for rotating step motor 7 into position with necessary positioning pressure while attached to frame 1 for moving carriage 6 through rack 6a which is provided with positioning pressure and meshes with pinion 7a' on rotational output shaft 7a of step motor 7 to adjust the relative position of the track position of the disk and recording head 5 to establish a predetermined positional relationship.

Back plate 7d of step motor 7 is a wrench receiving portion including a plurality of holes 7f which may be recessed portions for engaging special wrenches so that motor 7 can be rotated. Holes 7f are provided at symmetrical positions to engage pin wrenches, for example, from the back side of step motor 7. The wrench receiving portion also includes at least a pair of opposing surfaces represented by the symbol L which are engageable with a common standardized wrench such as a hexagonal wrench, as shown in the right half of FIG. 3.

The rotation of step motor 7 is adjusted by providing a gear 7b1 on the outer periphery of adapter plate 7b to mesh with a gear jig 14 on fixing portion 1b. Gear jig 14 is mounted over a screw receiving hole 1h for screw 15 and constitutes the fulcrum of rotation. The position of motor 7 is adjusted by rotating gear jig 14 which rotates gear 7b1. After the position of step motor 7 is adjusted, gear jig 14 is removed, since it is not essential to operation of apparatus 100.

The following are several examples of further mechanisms for adjusting the rotation of step motor 7. Each of these mechanisms has a separate structure and may be used either singly or in combination where the configurations so permit. The details of the structure for fixing step motor 7 and adjusting the rotation have been explained above. An important element, namely the detailed structure for setting the position where step motor 7 is secured to frame 1 when boss 7c is in hole 1d will be explained with reference to FIGS. 4 and 5.

FIG. 4 is an explanatory view for positioning step motor 7 as shown in FIG. 2. FIG. 5 is a sectional view of FIG. 4, showing the structure of the guide of step motor 7. Boss 7c acts as the reference for attaching step motor 7 in engagement with guide hole 1d formed on frame 1 and is indicated by the two-dot broken line.

The main part of the embodiment in FIG. 4 is enlarged to some extent to simplify the explanation. Boss 7c is engaged within guide hole 1d with a slight clearance therebetween. Guide hole 1d is provided with a plurality of projections 1j, forming an inscribed circle having a slightly smaller diameter than the outer diameter of boss 7c. Boss 7c is inserted into guide hole 1d and is supported by projections 1j without any clearance therebetween.

In order to engage boss 7c within guide hole 1d without allowing any clearance, it is necessary to deform either projections 1j or boss 7c. Since boss 7c also serves as the bearing, projections 1j are designed to deform rather than boss 7c which prevents any influence on the function of the bearing. Projections 1j have a substantially triangle cross section which facilitates deformation at their apex.

In order to facilitate insertion of boss 7c into guide hole 1d, projections 1j are formed in the middle of guide hole 1d and projections 1j are provided with a facing inclined surface $1j_1$. While three projections 1j are illustrated, one or more projections 1j are satisfactory, though this should be an odd number to provide proper balance.

In this structure for engaging boss 7c within guide hole 1d, although there is a slight clearance between boss 7c and guide hole 1d, the configurations of boss 7c and guide hole 1d allow easy engagement without interfering with the function of boss 7c, while removing the clearance. Thus, the horizontal position of step motor 7 with respect to reference surface 1c is ensured and step motor 7 will not even move by even several μm, except in the direction of the rotation of the external body. This structure requires minute manufacturing techniques, but these techniques are facilitated when frame 1 is formed of plastic.

Figure 6:
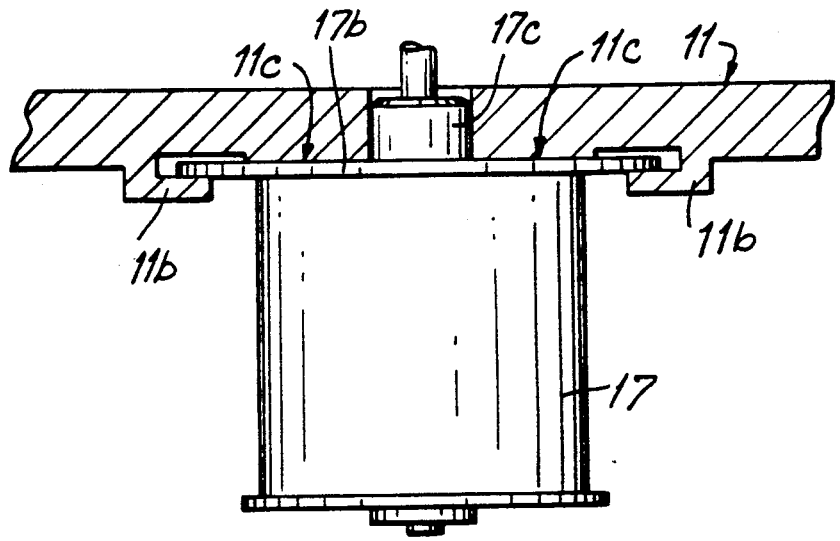
FIG. 6 is a partial sectional view of an example for mounting the step motor as shown in FIGS. 1 to 5.
Figure 7:
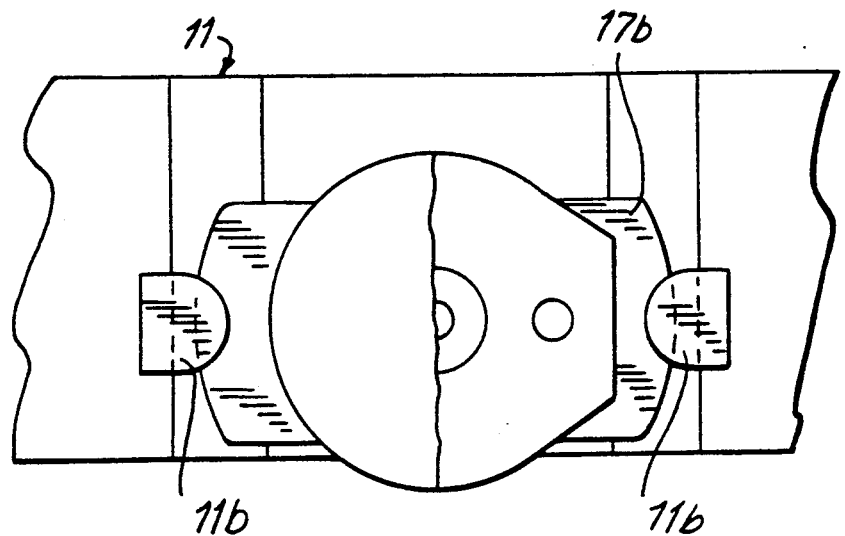
FIG. 7 is an elevational view of the mount of FIG. 6.

FIG. 6 shows another example of a structure for mounting a step motor 17 in accordance with the invention and FIG. 7 is an elevational view thereof. A boss 17c which also serves as a bearing is engaged in a frame 11 and serves as the reference position where step motor 17 is attached to frame 11. Step motor 17 is provided with a planar adapter plate 17b which extends to both sides of motor 17. Adapter plate 17b engages a fixing portion 11b of frame 11 and provides step motor 17 with necessary elasticity in the axial direction. Adapter plate 17b is pressed against a reference surface 11c of step motor 17 in the axial direction to hold step motor 17 in a state of having the positioning pressure necessary for attachment.

When step motor 17 is set in position by securing adapter plate 17b to fixing portion 11b, boss 17c is inserted into frame 11 such that step motor 17 is rotated by about 90 degrees from the position of adapter plate 17b shown in FIG. 7 and then step motor 17 is rotated into the position shown in FIG. 7 to engage adapter plate 17b with fixing portion 11b.

The structure of FIGS. 6 and 7 is different from the embodiment shown in FIGS. 2 and 3. However, both embodiments provide step motor 7 or 17 with the positioning pressure necessary for attachment in different ways. Adapter plate 7b has an elastic function. However, in addition to the slight elastic function of adapter plate 17b, fixing portion 11b of frame 11 itself has an elastic function, a useful characteristic resulting from forming frame 11 of a plastic material.

The remaining elements of the embodiment shown in FIGS. 6 and 7 are the same as in the embodiment shown in FIGS. 2 and 3. The structure for fixing step motor 17 is schematically shown in FIGS. 6 and 7 and including a screw as well as an adhesive is acceptable with little improvement of design. This embodiment has the same function and characteristics as the embodiment shown in FIGS. 2 through 5.

The above described structures makes excellent use of the advantages of a plastic frame. Frame 1 is rotatably secured to side-frames 2 and 3 in what is referred to as a floating state. Warping of the main part of frame 1 is prevented so that frame 1 may be very simple, light and frail.

It is important that a recording and reproducing apparatus insure the interchangeability of the data stored in the disk recording medium. It is essential that the relative position of the standardized track position of the disk and the recording and reproducing head have a predetermined relative position. However, the effects of a variation of temperature and humidity can destroy this carefully established relative position.

Figure 9:
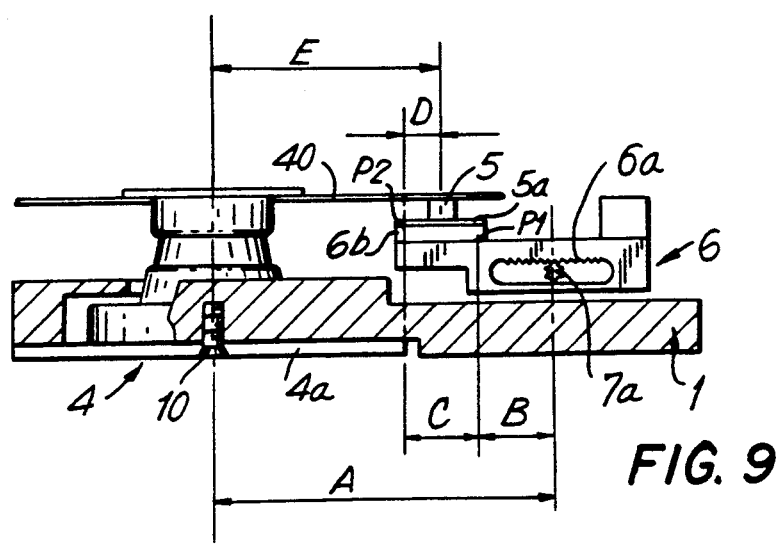
FIG. 9 is a partial sectional explanatory view of a portion of the apparatus of FIG. 8.

FIG. 9 is a schematic sectional view of the main part of the recording element shown in FIG. 1 and illustrates various important relative positions which must be maintained in apparatus 100.

Spindle motor 4 rotates a chucked disk 40 and is secured by screws 10 to plastic frame 1. Carriage 6 carries head 5 on a support plate 5a and is freely displaceable in the radial direction of disk 40 by a guide (not shown). Carriage 6 is provided with rack 6a which meshes with pinion 7a, and moves with the rotation of pinion 7a.

Head 5 is mounted on carriage 6 in such a manner as to make the fixing points clear. Support plate 5a of head 5 is bonded to a spacer 6b at a point P2 by a first adhesive, and spacer 6b is bonded to carriage 6 at a point P1 by a second adhesive. Support plate 5a of head 5 and spacer 6b and spacer 6b and carriage 6 are bonded to each other by a third adhesive, which is softer than the first and second adhesives and is elastic so that support plate 5a, spacer 6b and carriage 6 do not "float" in the horizontal direction and support plate 5a and spacer 6b can stretch somewhat from points P2 and P1, respectively.

In this embodiment, frame 1 is formed of a plastic material having a thermal expansion coefficient of $\alpha_1$, base 4a of spindle motor 4 is formed of an iron material having a thermal expansion coefficient of $\alpha_2$, carriage 6 is formed of an iron material having a thermal expansion coefficient of $\alpha_3$, spacer 6b is formed of a plastic material having a thermal expansion coefficient of $\alpha_4$, support plate 5a is formed of a stainless steel material having a thermal expansion coefficient of $\alpha_5$ and the base material of disk 40 is polyethylene terephthalate having a thermal expansion coefficient of $(17\pm8)\times10^{-6}/°C$. and a humidity expansion coefficient of $(0$ to $15)\times10^{-6}/\%$ RH. More specifically:

$\alpha_1$ is $12\times10^{-6}/°C$. to $35\times10^{-6}°C$., (frame 1, length A);

$\alpha_2$ is $11.6\times10^{-6}/°C$. (base 4a);

$\alpha_3$ is $11.6\times10^{-6}/°C$., (carriage 6, length B);

$\alpha_4$ is $15\times10^{-6}°C$., (carriage 6, length B);

$\alpha_5$ is $17.4\times10^{-6}/°C$. and (spacer 6b, length C);

As shown in FIG. 1, two screws 10 for securing spindle motor 4 to frame 1 are disposed near the center of spindle motor in consideration of the positional relationship between the spindle motor 4 and the head 5. Screws 10 join frame 1 made of a plastic material having a thermal expansion coefficient of $\alpha_1$ and base 4a of spindle motor 4 made of an iron material having a thermal expansion coefficient of $\alpha_2$. When there is a change in temperature, frame 1 contracts or expands towards head 5 from the position of screws 10 in the vicinity of the center of spindle motor 4 in response to a combination of the different expansion coefficients. In order to secure spindle motor 4 on frame 1, it is advantageous to provide a plurality of screws 10 on the outer periphery of base 4a. However, frame 1 and base 4a have different thermal expansion coefficients. The screws make the thermal expansion of base 4a unpredictable and can create warp on frame 1 or base 4a. This creates a relative dislocation of spindle motor 4 and head 5 when there is a change in temperature.

This possibility is eliminated and spindle motor 4 is fixed to frame 1 by restricting the stretching stress from thermal expansion to a minimum and make the base from which frame 1 contracts from or expands towards head 5 definite. Accordingly, two screws 10 are positioned near the center of spindle motor 4 taking the positional relationship between spindle motor 4 and head 5 into consideration. The surface of frame 1 for receiving base 4a protrudes slightly at a portion away from screws 10 to come into contact with base 4a of the spindle motor 4 when screws 10 are tightened.

In the structure shown in FIG. 9, the deviation of the predetermined relative position of disk 40 and head 5 (hereinafter referred to as "off-track"), that occurs when the temperature changes by $\Delta°C$., is represented by the following formula:

$$(D\times\alpha_5)-E\times(17\pm8)]\times10^{-6}\times\Delta(°C.)$$

Based on this, it is evident that it is essential to control $(A\times\alpha_1)$, the expansion of frame 1 to minimize the amount of off-track. In addition, carriage 6 is driven to keep head 5 accessible to disk 40 by the nodal movement of pinion 7a which meshes with the rack 6a.

In FIG. 1, plastic frame 1 with the main functional elements for recording and reproducing mounted thereon necessarily has a complicated configuration, especially in the vicinity of the step motor 7 and the carriage 6. In molding plastic frame 1, the flow is complicated in spite of attempts to simplify it, by improving the position, configuration, etc. of the gate.

The thermal expansion coefficient and the rigidity of a plastic molded product may be controlled by filling a pure plastic material with several percent of glass fibers, for example, before molding, to utilize the beneficial characteristics of the glass fibers with respect to the direction of the orientation of the glass fibers. When a plastic molding has a complicated configuration, the flow is complicated in spite of attempts to simplify it by improving the position, the configuration, etc. of the gate. When molding with a plastic material filled with several percent of glass fibers or the like, the direction of orientation of the glass fibers becomes very irregular and it is difficult to control the characteristics of the plastic because the fibers are not uniform throughout.

The rigidity and the thermal expansion coefficient of molded plastic material exhibits slight localized differences. From the microscopic point of view, when there is a change in temperature, the plastic material does not contract or expand in a similar manner throughout and the initially predicted (controllable) expansion and contraction will not occur.

These disadvantages are present in a molded piece such as frame 1. Frame 1 must have a complicated configuration in the vicinity of step motor 7 and carriage 6. By filling the plastic material with several percent of glass fibers for example, before molding, the direction of orientation of the glass fibers become so irregular that controlling the characteristics of the plastic from the effects of the glass fibers is difficult. The rigidity and the thermal expansion coefficient of frame 1 are slightly different in different positions. When there is a change in temperature, it is difficult to control contraction or expansion as in the initial configuration.

Step motor 7 is disposed substantially orthogonal to the direction of movement of carriage 6. Rack 6a is substantially orthogonal to pinion 7a. However, when there is a change in temperature, frame 1 does not contract or expand in a similar manner to the initial predicted configuration If the non-uniform contraction or expansion of frame 1 causes step motor 7 to incline only slightly with respect to the direction of the movement of carriage 6, the inclination directly affects the amount of off-track position. Accordingly, the off-track due to the inclination of the step motor 7 is added to the off-track produced by the contraction or expansion of frame 1 by (A×α1). Consequently, in order to control contraction or expansion from temperature changes as in the initial configuration, even from the microscopic point of view, and to reduce the difference in the rigidity and the thermal expansion coefficient in localities, frame 1 is preferably formal as follows.

1. A plastic material for forming frame 1 is filled with several percent of glass fibers and several percent of carbon fibers to obtain the desired rigidity and thermal expansion coefficient. Addition of carbon fibers enables the thermal expansion coefficient and the rigidity of a plastic molded product to be within a desireable controllable range. The carbon fibers affect the plastic frame in a different direction than the direction of the orientation of the glass fibers so that one compensates for deficient characteristics of the other.

In this embodiment, as a condition for molding frame 1, a gate 1p is disposed on the opposite side of step motor 7 and carriage 6. During molding, flow is controlled in the direction from gate 1p to step motor 7 and carriage 6 and the orientation of the glass fibers is controlled in the direction of the flow.

2. By making the carbon fibers shorter than the glass fibers, control of expansion and contraction becomes less dependent on the direction of the orientation of the glass fibers. The length of the carbon fibers is preferably 30% to 70% of the glass fibers.

3. The weight ratio of the glass fibers and the carbon fibers mixed with a plastic material is advantageously between about 5% to 35%:5% to 25% and the balance is plastic material. When ease of molding and cost are taken into consideration, it is preferable to mix 15% to 25% of glass fibers and 20% to 30% of carbon fibers by weight in the plastic material.

If the weight ratio of the glass fibers or the carbon fibers exceed 35%, the molding characteristics deteriorate considerably. This greatly restricts the selection of a plastic material which constitutes the balance.

4. By varying the mixing ratio of the glass fibers and the carbon fibers, the modulus of flexure can be controlled to within the range of between about $1 \times 10^5$ kg/cm$^2$ to $2 \times 10^5$ kg/cm$^2$. Generally, higher rigidity is preferable.

5. By adjusting the mixing ratio of the carbon and glass fibers the thermal expansion coefficient of frame 1 is controllable in the range of $12 \times 10^{-6}/°C$. to $35 \times 10^{-6}/°C$. This is very close to the thermal expansion coefficient of a recording medium. Since the base material of disk 40 is polyethylene terephthalate, which has a thermal expansion coefficient of $(17 \pm 8) \times 10^{-6}/°C$., the thermal expansion coefficient of frame 1 is preferably controlled to within the range of about $15 \times 10^{-6}/°C$. to $25 \times 10^{-6}/°C$.

Accordingly, by utilizing the above described improvements, localized differences in thermal expansion and thereby the amount of off-track is kept to a minimum.

Recording and reproducing apparatus 100 incorporates many electronic parts such as integrated circuits, which are easily destroyed by static electricity and the like. The same applies to the peripheral devices of a system apparatus incorporating the recording and reproducing apparatus. It is therefore essential to prevent electrical buildup.

A plastic material intrinsically is an insulating material, but can become charged with static electricity and the like. If frame 1 is a plastic material mixed with carbon fibers, it has a slight electric conductivity and, hence, will not become charged with static electricity or the like. The lack of static electric buildup also prevents the attraction of dust. It is therefore unnecessary to take special consideration into installing or handling frame 1 to avoid dust buildup.

Preventing static electrification of frame 1 is achieved by mixing carbon fibers with the plastic material so as to provide a slight conductivity for frame 1. Although the plastic material for frame 1 has been described as including several percent glass fibers in addition to several percent carbon fibers, it is also acceptable to mix only several percent carbon fibers with the plastic material to provide frame 1 with the necessary rigidity and to prevent static electrification. The amount of carbon fibers is preferably high to increase the rigidity of frame 1.

The humidity expansion coefficient for the polyethylene terephthalate base material of disk 40 is (0 to 15)$\times 10^{-6}$/% RH. Controlling the humidity expansion coefficient is important to minimize the amount of off-track caused by a change in humidity just as controlling the coefficient of thermal expansion is important to control the amount of off-track caused by a change in temperature.

In a conventional frame made of a metal, such as die-cast aluminum the control of the effects of the humidity expansion coefficient on off-track is difficult because a metal frame will not expand or contract from changes in humidity. However, plastic material intrinsically has a moisture absorption characteristic and a frame formed of plastic material contracts or expands due to changes in humidity. This facilitates a design for minimizing and controlling the amount of off-track caused by changes in humidity.

The following engineering plastics are preferable for forming frame 1 with the previously described characteristics:

1) Polyphenylene sulfide (PPS) resin + glass fibers + carbon fibers
2) Polyphenylene ether (PPE) resin + glass fibers + carbon fibers
3) Polypropylene (PPO) resin + glass fibers + carbon fibers 4) Polyethylene terephthalate (PET) resin+glass fibers+carbon fibers
5) Polycarbonate (PC) resin+glass fibers+carbon fibers
6) Acrylonitrile butadiene and styrene (ABS) resin + glass fibers+carbon fibers
7) Polyether imide resin+glass fibers+carbon fibers Carbon fibers are mixed with a plastic material in addition to glass fibers to control the rigidity and the thermal expansion coefficient of frame 1 in a direction different from the direction of the orientation of the glass fibers and to provide frame I with a slight electric conductivity. Alternatively, it is possible to reduce costs by filling the plastic materials with a filler, such as calcium carbonate which will control the rigidity and the thermal expansion coefficient of the frame in a direction different from the direction of the orientation of the glass fibers and with carbon powder to provide frame 1 with a slight electric conductivity.

Further, a polybutylene terephthalate (PBT) resin may be blended with each of the above-described resins to form a polymer alloy. This enables further minute control of the characteristics of the plastic, such as the rigidity and the thermal expansion coefficient.

Figure 8:
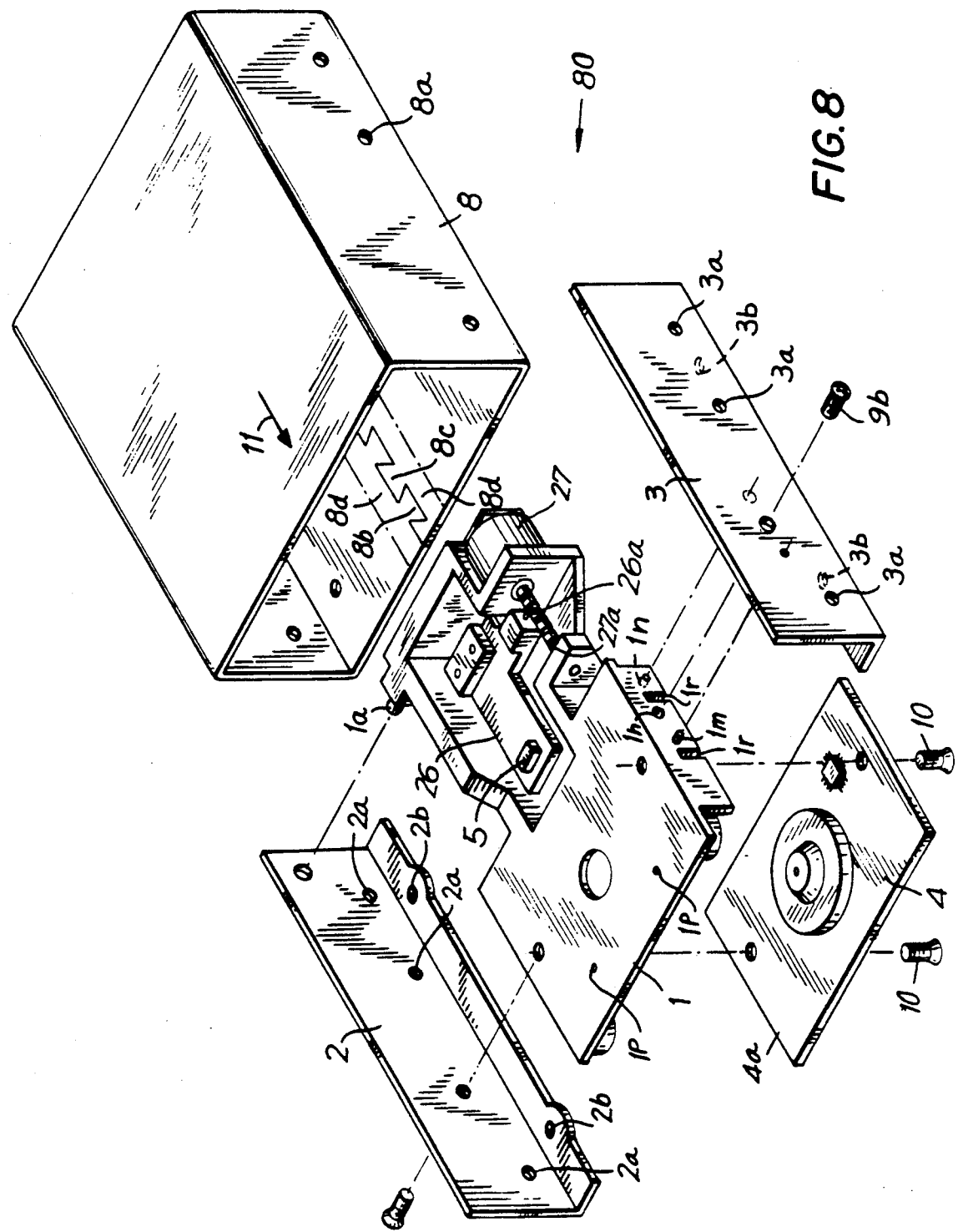
FIG. 8 is an exploded perspective view of a recording and reproducing apparatus constructed in accordance with another embodiment of the invention.

A second embodiment of a recording and reproducing apparatus 80 formed in accordance with the invention is explained generally with reference to FIG. 8. The same structural elements have been assigned the same reference numerals. Frame 1 for mounting the main functional device for recording and reproducing is provided with spindle motor 4 as a rotational driving device for chucking and rotating a disk recording medium (not shown). A carriage 26 driven by a step motor 27 carries recording head 5 as a signal converting device for receiving and supplying a signal to and from the recording medium. Carriage 26 is freely displaceable in the radial direction of the recording medium by a guide (not shown) to keep head 5 accessible to the recording medium.

Carriage 26 includes an acicular lead pin 26a which is provided with a pilot pressure (not shown), to be engaged with a lead screw 27a on the rotational output of step motor 27. Lead screw 27a is disposed parallel to the direction of the movement of carriage 26. Carriage 26 is driven to keep head 5 accessible to the recording medium in accordance with the nodal movement of step motor 27.

The relative positions between the standardized track position and head 5, is adjusted by rotating the body of step motor 27 to move carriage 26. Lead pin 26a is provided with a positioning pressure and engages lead screw 27a on the rotational output shaft of the step motor 27. The mechanism for minutely adjusting the relative positions between the track position and head 5 and maintaining the adjusted state without producing any dislocation in this embodiment is the same as that explained above with reference to FIGS. 2 yo 7.

The relative dislocation between the standardized track position and head 5 which may be caused when recording and reproducing apparatus 80 is used in an environment having varying temperature and humidity, is minimized by using similar considerations as taken into account with the first embodiment and are not repeated here.

Lead screw 27a is disposed parallel to the direction of the movement of carriage 26. If the contacting alignment of the lead portion of lead screw 27a and lead pin 26a is dislocated, an off-track position corresponding to the lead pin angle is added to the off-track position caused by the contraction or expansion of frame 1 in the radial direction of the recording medium. This is referred to as an error in parallelism in the seeking structure of carriage 26.

It is possible to control the contraction or expansion of plastic frame in a similar manner as in the initial configuration by reducing localized differences in the rigidity and the thermal expansion coefficient.

Case 8 is folded from both sides to form a substantially prismatic configuration from a plate like member, as described above with reference to FIG. 1. Case 8 has a slight elasticity and a substantially rectangular prismatic configuration with the same inner dimension as the outer dimension of side-frames 2 and 3. At the portion where both ends meet, a plurality of dovetail protrusions 8b and 8c, each having a larger end portion are provided at the respective end portions such that the concave portions between the protrusions 8b on one end portion are in conformity with the corresponding protrusions 8c on the other end portion. The end portions are engaged with each other in the direction of thickness so as not to slip off in the direction of length or width. In other words, the end portions are combined with each other in what is called fastener bonding, and there is no gap at the juncture. Thus, a uniform and strong shielding and protecting effect which has no directional property with respect to the source of noise is provided.

Frame 1, in this embodiment has a structure which effectively utilizes the advantages of plastic materials. By affixing case 8 to side-frames 2 and 3, by tightening screws into screw receiving holes 2a, 3a, 2b and 3b, case 8 is in close contact with side-frames 2 and 3. Case 8 is made of a light highly electrically conductive metal such as aluminum or a metal having excellent magnetic shielding properties. It is effective for keeping out the corresponding noises The shielding and protecting effect on the main functional device for recording and reproducing is further enhanced when the seeking structure is made of a metal material such as a magnetic material which is the same material that forms carriage 26.

In addition, since case 8 is slightly elastic, it comes into close contact with side-frames 2 and 3. Therefore, no error in parallelism is produced on lead screw 27a which is disposed in parallel to side-frames 2 and 3. The direction of the movement of carriage 6 of an electricly conductive material, thereby facilitating the control for minimizing the amount of off-track.

The seeking structure of carriage 26 is formed of a combination of lead screw 27a and lead pin 26a. Alternatively, other known seeking structures such as those in which a steel belt is wound around a capstan of the step motor in the configuration of the letter α and both ends thereof are bonded to the carriage, may be utilized. In that case, the mechanism for minutely adjusting the relative positions between the track position and the head by the rotation of the step motor that was explained above with reference to FIGS. 2 through 7 is also applicable. The previously described mechanism for controlling and minimizing the amount of off-track is also applicable.

The size of system assemblies incorporating a recording and reproducing apparatus have recently become smaller. Small system apparatuses only prevent various noises such as the noise from a power source and the noise from radiation slightly.

Case 8 in this embodiment is formed from a plate-like member, which is folded from both sides so as to form a substantially prismatic configuration. The portions at which both ends meet are combined with each other in what is called fastener bonding. As the means for preventing the end portions from slipping off each other, tape 8d is pasted to the juncture of fastener bonding. It is also possible to use a pipe material having a substantially prismatic shape in place of tape 8d.

Although case 8 in this embodiment is formed from a folded plate-like member, the method for forming case 8 is not so restricted as long as the objects of shielding and protecting the main functional device for recording and reproducing is achieved. For example, a plate-like member may be combined on a side surface, or at the upper portion. Alternatively, case 8 may be formed of more than one plate-like member such as a combination of an upper portion and a lower portion or a right-hand side portion and a left-hand side portion.

Since side-frames 2 and 3 are disposed on both sides of frame 1 in this embodiment, as shown in FIG. 1, if side-frames 2 and 3 are made of an electrically conductive material and are electrically coupled to case 8, an approximate shielding and protecting effect may be produced even if the right-hand side surface or the left-hand side surface is not completely joined Cutting out interfering noise is important. In this embodiment case 8 is provided with a plurality of through holes 8a at the positions which correspond to the plurality of fixing screw receiving holes 2a, 2b and the plurality of fixing screw receiving holes 3a, 3b provided on side-frames 2 and 3, respectively. When frame 1 is secured to a base by screws from the base side through holes 8a and the plurality of fixing-screw receiving holes 2a and 3a or 2b and 3b, case 8 is brought into close contact with side-frames 2 and 3. If the case 8 is made of a light metal having excellent electric conductivity, such as aluminum or a metal excellent in magnetic shielding property, it is effective for cutting out the corresponding noises. In addition, since case 8 is slightly elastic and comes into close contact with side-frames 2 and 3 when screwed thereto, there is no error in the parallelism produced on lead screw 27a which is disposed in parallel to sideframes 2 and 3 and parallel to the direction of the movement of carriage 6 formed of an electrically conductive material. This facilitates the control for minimizing the amount of off-track.

In this embodiment, case 8 substantially covers the entire outer periphery of frame 1. Because frame 1 is formed of a plastic material, it intrinsically has poor characteristics with respect to noise shielding. However, case 8 substantially covers frame 1. Thus, a uniform and strong shielding and protecting effect which has no directional property with respect to the source of noise is achieved. This enables stable recording and reproduction without the adverse influences of noise If frame 1 is formed of a plastic material and case 8 of a light alloy such as an aluminum material, it is possible to provide a very light-weight recording and reproducing apparatus. If frame 1 is formed of a plastic material, it will not become electrified when, for example, an electrical field is applied.

Furthermore, case 8 is formed from a plate-like member, which is folded from both sides to form a substantially prismatic configuration. The portions at which both sides meet are combined with each other in what is called fastener bonding, and there is no gap at the juncture. Thus, not only is a uniform and strong shielding and protecting effect achieved which has no directional property with respect to the source of noise, but it is also possible to provide a recording and reproducing apparatus having excellent handling properties and having a simple and beautiful external appearance. To prevent the end portions from slipping off each other, tape 8d is pasted to the juncture of fastener bonding. It is also possible to use a pipe material having a substantially prismatic shape in place of tape 8d.

If frame 1 is formed of plastic, it will not become electrified when, for example electric field or the like is externally applied. To preventing electrification by case 8, plastic frame 1 does not include carbon fibers or carbon powder which provide a slight electric conductivity and provide a means for preventing electrification as described above. Accordingly, when frame 1 is covered with and protected by case 8, the following types of plastic materials containing no carbon fibers may be effectively used as well as the above-described plastic materials which are filled with the carbon fibers.

a) PPS resin + glass fibers
b) PPE resin + glass fibers
c) PPO resin + glass fibers
d) PET resin + glass fibers
e) PC resin + glass fibers
f) ABS resin + glass fibers
g) Polyether imide resin + glass fibers In the above-described plastic materials, when the control of the rigidity and the thermal expansion coefficient in a direction different from the direction of the orientation of the glass fibers is necessary, a filler such as calcium carbonate and carbon may be mixed with the plastic materials in a pulverized state. When the frame is formed of a plastic material including a PPS resin + glass fibers + a filler it has a high rigidity and can be put to practical use. The absence of carbon fibers reduces the cost.

Furthermore, a PBT resin may be blended with each of the above-described resins to form a polymer alloy, thereby enabling further minute control of the plastic characteristics such as rigidity and thermal expansion coefficient. If blending a PPT resin eliminates the need of filling the plastic with carbon fibers or the like, the fluidity of the molten resin during molding is greatly enhanced This enables the mixing ratio of about 20% to 65% of glass fibers by weight ratio and a mixing ratio of 20% to 65% of glass fibers and a filler by weight ratio are possible. A PBT resin mixed to form a polymer alloy is preferably 20% to 50% by weight ratio.

Figure 10:
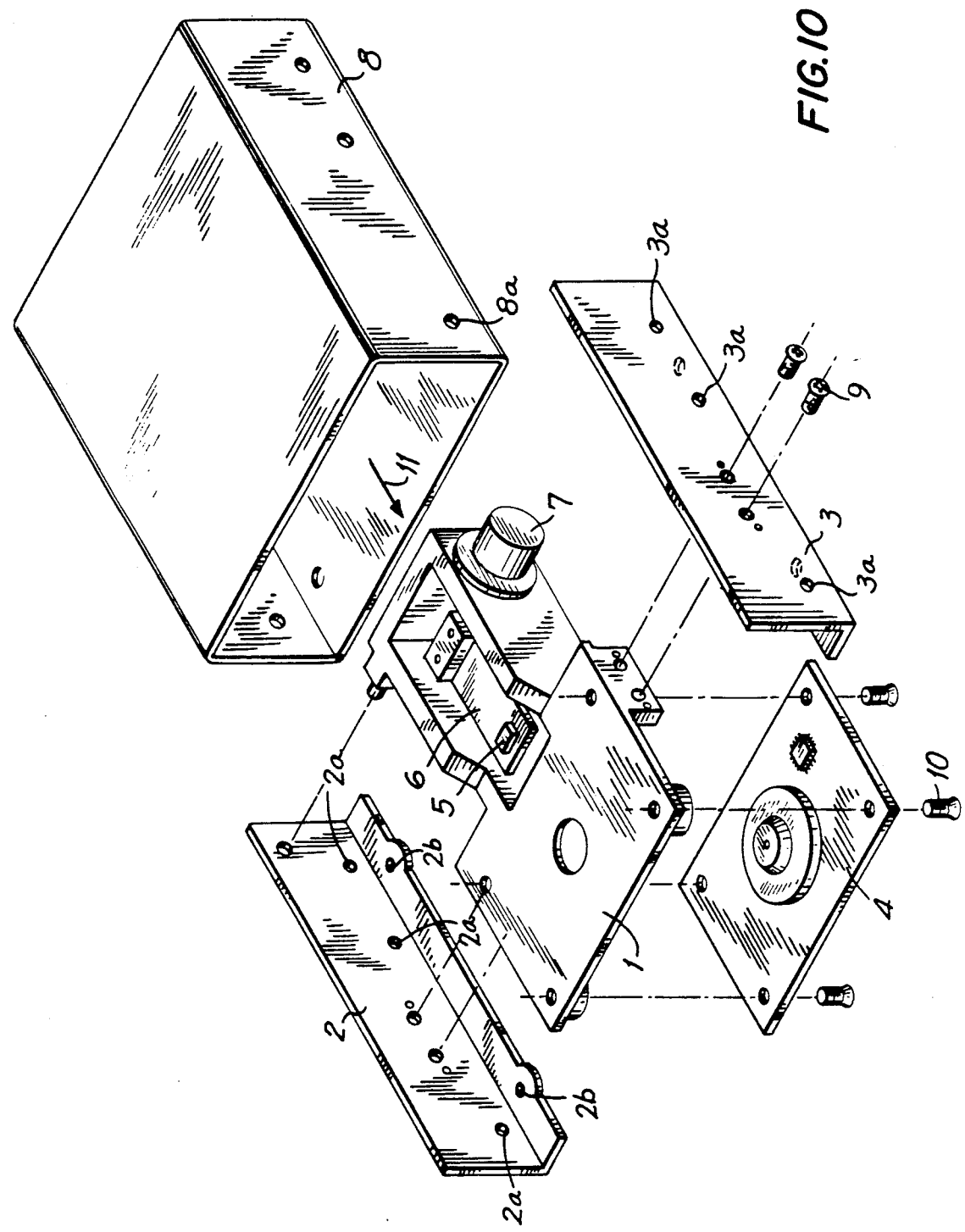
FIG. 10 is an exploded sectional view of a recording and reproducing apparatus constructed in accordance with a further embodiment of the invention.

FIG. 10 is an exploded perspective view of a third embodiment of a recording and reproducing apparatus constructed in accordance with the invention. Side-frames 2 and 3 are identical to and have the same function as the side-frames in the embodiment shown in FIG. 1. Side-frames 2 and 3 are combined with frame 1 by screws 9 with small pitches therebetween towards the substantially horizontal center of gravity rotatably to balance frame 1 in a semi-fixed floating state. Projection 1a of frame 1 and engaging hole 2c of side-frame 2 have the same function as in the first embodiment. Frame 1 has a slight elasticity which allows a twisting displacement at the positions at which frame 1 is joined with side-frames 2 and 3 by screws 9.

When a relative dislocation is produced on the surface which faces the base (not shown) of, for example, a system apparatus and the screws are tightened into fixing-screw receiving holes 2b and 3b, only a local warp is produced on frame 1. Thus, the generation of warp is prevented at the portion at which the main functional device for recording and reproducing is mounted on frame 1. Frame 1 can be made of a lightweight material, such as aluminum or a plastic material in the same way as in the earlier described embodiments.

Frame 1 is rotatably supported in what is called floating state in a manner to keep a good balance and not to exert a deleterious influence on the main functional device for recording and reproducing even when the recording and reproducing apparatus of this embodiment meets an external disturbance such as dropping, a violent vibration and a violent shock.

Two screws 9 are disposed on each side for coupling each side-frame 2 and 3 with frame 1 rotatably to support frame 1 in the embodiment shown in FIG. 10. In contrast, in the embodiment shown in FIG. 11, two screws 15 couple side-frame 2 to frame 1 and one screw 16 couples side-frame 3 to frame 1. The remaining elements are the same as in the embodiment shown in FIG. 10. Side-frame 3 which is only coupled by one screw 16 is not rotationally restricted around screw 16. The relative position of side-frame 3 in the rotational direction with respect to side-frame 2 which is fixed by two screws 15 is adaptable in any way. Because there is a relative fitting action in the rotational direction where side-frame 3 is secured to frame 1 by one screw, there is no need for frame 1 to have slight elasticity as in the embodiment shown in FIG. 10. The generation of warp on frame 1 is further suppressed.

Various other combinations and configurations of screws 15 and 16 are possible. For example, a combination of one screw 15 and one screw 16 disposed on the respective sides or a combination of a plurality of screws 15 and one screw 16 are also effective. When one screw 15 is used to join side-frame 2 with frame 1, the relative fitting action in the rotational direction at the juncture of side-frame 2 and frame 1 is further enhanced. When securing the recording and reproducing apparatus from the bottom side, as in the embodiment shown in FIG. 10, even if a relative dislocation is produced on the surface which faces the base, almost no warp is produced on the frame 1. Thus, a similar prevention of warp as in the embodiment shown in FIG. 10 is displayed.

Figure 11:
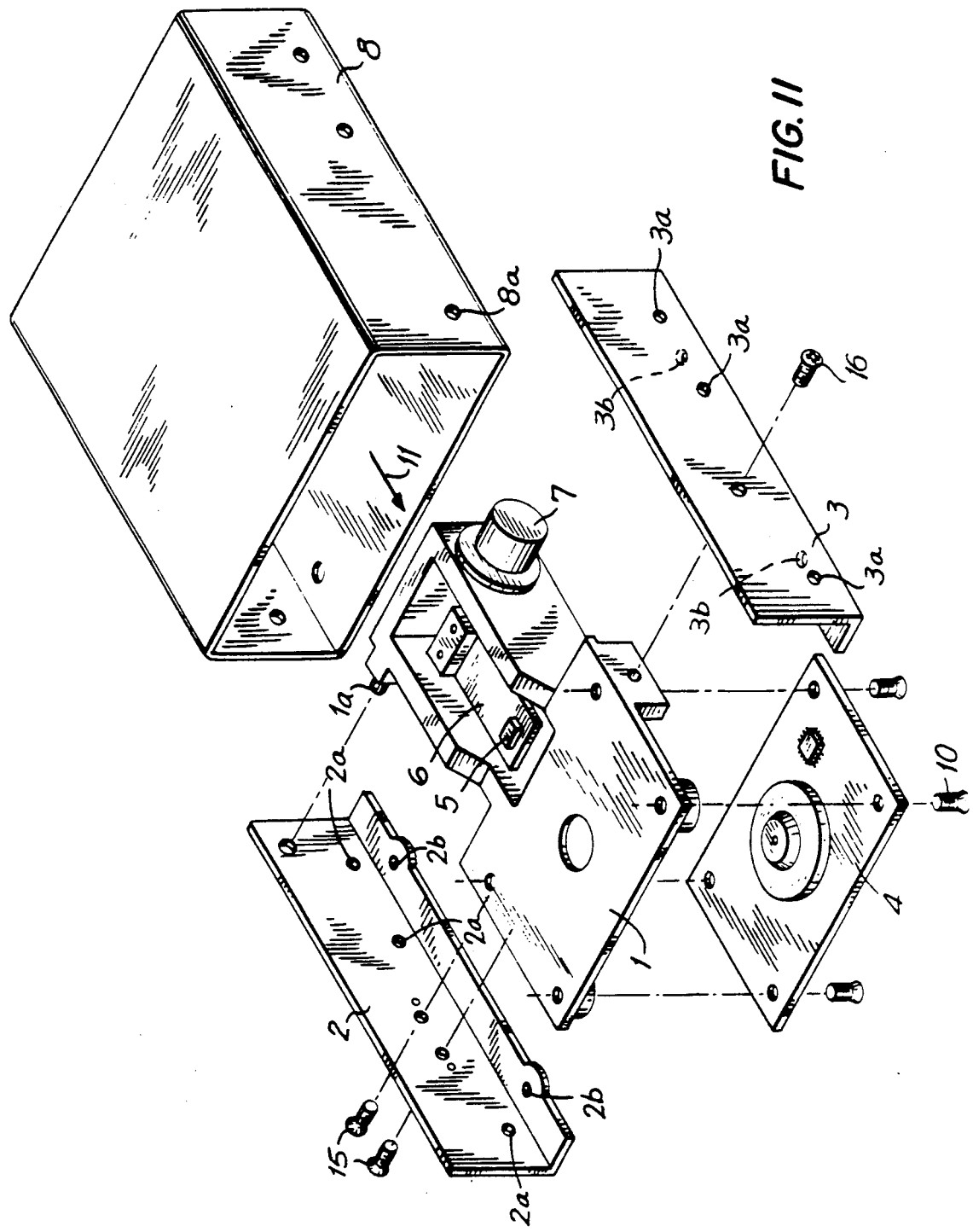
FIG. 11 is an exploded perspective view of a recording and reproducing apparatus constructed in accordance with a modified embodiment of FIG. 10.

The number of screws and the position of the screws with respect to side-frames 2 and 3 shown in FIG. 11 may be reversed. Further, although side-frames 2 and 3 are depicted as joined to frame 1 by screws, an alternative coupling device such as welding or caulking will function similarly.

Figure 12:
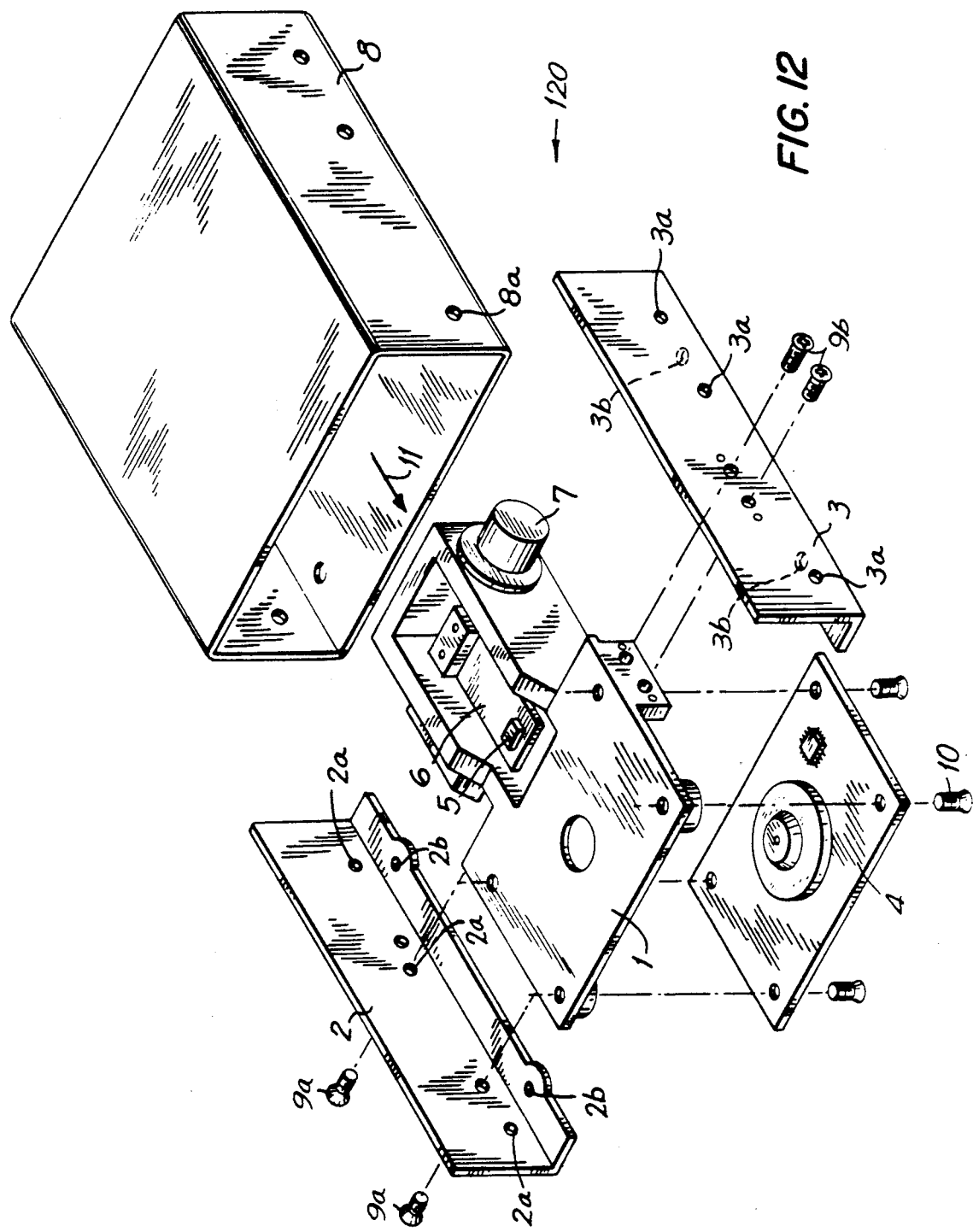
FIG. 12 is an exploded perspective view of a recording and reproducing apparatus constructed in accordance with yet another embodiment of the invention.
Figure 13:
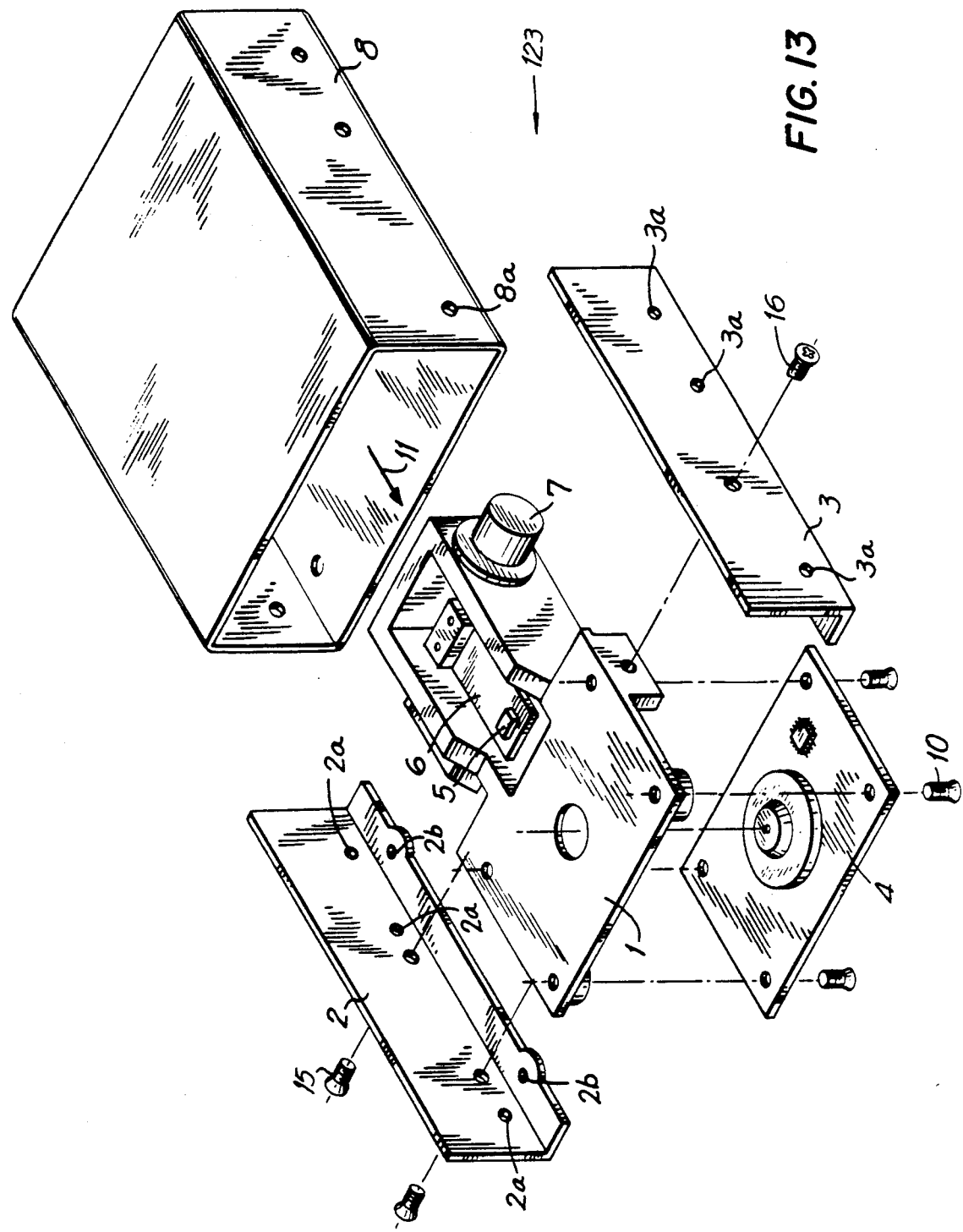
FIG. 13 is an exploded perspective view of a recording and reproducing apparatus constructed in accordance with a modified embodiment of FIG. 12.
Figure 14:
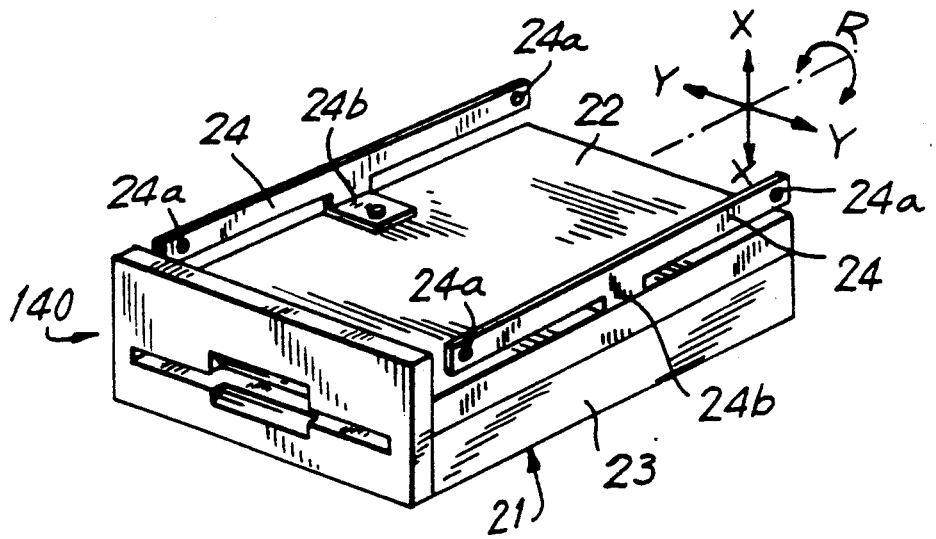
FIG. 14 is a perspective view of the back surface of a conventional recording and reproducing apparatus.
Figure 15:
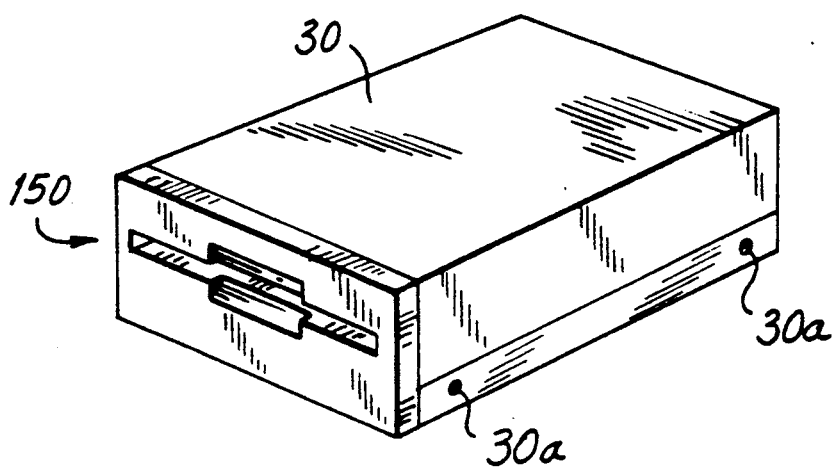
FIG. 15 is a perspective view of another conventional recording and reproducing apparatus.

FIG. 12 is an exploded perspective view of a preferred embodiment of a recording and reproducing apparatus 120, constructed in accordance with the invention. FIG. 13 is an exploded perspective view of apparatus 123, a modification of apparatus 120 of FIG. 12.

Side-frames 2 and 3 in FIG. 12 have substantially the same structure and function as side-frames 2 and 3 in the embodiment shown in FIG. 1. Side-frame 2 is joined to frame 1 by screws 9a at positions in which the rigidity of side-frame 2 and frame 1 are increased. Side-frame 3 is combined with frame 1 by screws 9 with small pitches therebetween near the horizontal center of gravity rotatably to support frame 1. Frame 1 thereby has a slight twisting elasticity at positions where frame 1 is joined to side-frame 3 by screws 9.

In the embodiment of FIG. 11, when side-frames 2 and 3 are screwed to frame 1 through fixing-screw receiving holes 2a and 3a, the elastic displacement of side-frame 3 in outwardly opposite directions or inwardly facing directions can occur, but the elastic displacement of side-frame 2 is slight. Since side-frame 2 is joined to frame 1 by a configuration which increases the respective rigidity only the elastic displacement of side-frame 3 can prevent a warp of the frame 1.

Apparatus 120 is constructed with two screws 9a to join side-frame 2 with frame 1 by a structure which increases the respective rigidity. A similar way to join them that increases the respective rigidity employs several screws or few screws and an additional mechanism for firmly coupling side-frame 2 or 3 to frame 1.

Frame 1 of apparatus 120 is rotatably secured to side-frames 2 and 3 in a floating state when frame 1 is secured to side-frames 2 and 3 by tightening screws into the plurality of fixing screw receiving holes 2a, 3a or the plurality of fixing screw receiving holes 2b, 3b. When the recording and reproducing apparatus encounters an external disturbance, such as being dropped, violently vibrated or violently shaken, frame 1 could assume a violent resonant state or cause dislocation in the system of and side-frames 2 and 3. However, in this embodiment, side-frame 2 is joined with frame 1 by a structure which increases the respective rigidity and prevents this from occurring Because side-frame 2 is firmly and rigidly joined to frame 1, which has a slight elasticity, violent resonance and displacement of frame 1 is prevented.

Apparatus 123 shown in FIG. 13, employs two widely separated screws 15, for joining side-frame 2 to frame 1 and one screw 16 for joining side-frame 3 to frame 1 The effects of joining frame 1 to side-frames 2 and 3 are similar to those previously described The remaining elements are the same as in apparatus 120.

The devices constructed in accordance with the invention have many beneficial attributes. The plastic frame supporting the main recording and reproducing components of the apparatus resists warp and deformation. The thermal expansion coefficient of the frame is taken into consideration, and when there is a change in temperature, the frame contracts or expands in a substantially similar manner to that of the recording medium and the position of the standardized track position with respect to the signal converting device is controlled and has substantially the same position. This enables stable recording and reproduction.

Employing plastic material for mounting a recording and reproducing functional device is not only inexpensive, but well suited for mass production. It is also very effective for reducing the weight of a recording and reproducing apparatus to meet the increasing demand for a light weight apparatus for inclusion in word processors, lap-top computers and the like which can be hand carried.

The frame may be formed of a plastic material including several percent glass fibers and several percent of a filler. Although the frame might have a complicated shape, the glass fibers and filler mixed with the plastic material impart favorable characteristics and compensate for the other's deficiencies. This facilitates control of the rigidity and the thermal expansion coefficient of the frame. This is difficult in a conventional frame formed of a pure plastic material or a plastic material filled with glass fibers. Thus, a plastic frame with these qualities can be employed for the first time.

When there is a relative deviation of the position or horizontal direction of the fixing holes or the like provided on the base of an apparatus incorporating the recording and reproducing apparatus, the frame carrying the recording head will not warp due to the elasticity or the twisting displacement of the side-frames. When the recording and reproducing apparatus meets an external disturbance, either the displacement regulating construction or fixing one side-frame to the frame by a structure which increases the respective rigidities, regulates the displacement to a predetermined amount. This prevents deviation of the position of the recording and reproducing apparatus.

Even if a resonance is produced on the system composed of the side-frames and the frame, the amplitude is regulated to suppress large amplitude violent resonance to protect the recording and reproducing functional device.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A recording and reproducing apparatus, comprising:
    a frame having a thermal expansion coefficient between about $12 \times 10^{-6}/°C$ to $35 \times 10^{-6}/°C$ formed of a synthetic resin material including an effective amount of a filler for controlling the thermal expansion coefficient of the frame;
    carriage means supported by the frame for displacement with respect to the frame;
    rotating means mounted on the frame, the rotating means for rotating a recording medium;
    driving means mounted on the frame and operatively engaged to the carriage means for selectively displacing the carriage means with respect to the frame; and
    signal converting means for receiving and supplying a signal to and from a recording medium mounted on the carriage means for movement with the carriage means, the carriage means and signal converting means adapted to move freely in the radial direction of the rotating recording medium so as to access the entire surface of the recording medium.

2. The recording and reproducing apparatus of claim 1, wherein the thermal expansion coefficient of the frame is approximately equal to the thermal expansion coefficient of the recording medium.

3. The recording and reproducing apparatus of claim 1, wherein the synthetic resin material for the frame includes glass fibers mixed therein.

4. The recording and reproducing apparatus of claim 3, wherein the synthetic resin for the frame further includes carbon fibers.

5. The recording and reproducing apparatus of claim 4, wherein the glass fibers and the carbon fibers are aligned in different directions within the synthetic resin.

6. The recording and reproducing apparatus of claim 4, wherein the synthetic resin material for the frame includes about 5 wt% to 35 wt% glass fibers, 5 wt% to 35 wt% carbon fibers and the balance the synthetic resin.

7. The recording and reproducing apparatus of claim 3, wherein glass fibers are present between about 20% to 65% by weight.

8. The recording and reproducing apparatus of claim 1, wherein the synthetic resin material for the frame includes glass fibers and a filler mixed therewith.

9. The recording and reproducing apparatus of claim 8, wherein the glass fibers and filler are present between about 20% to 65% by weight.

10. The recording and reproducing apparatus of claim 1, further including case means including electrostatic shielding material for substantially enclosing and shielding the frame.

11. The recording and reproducing apparatus of claim 10, wherein the case means is formed from a plate-like shielding material shaped into the configuration to surround and enclose the frame and end surfaces of the shielding material are bonded to each other.

12. The recording and reproducing apparatus of claim 10, further including a pair of elongated side-frame members mounted to opposite sides of the frame, the side-frame members mounted to the inside of the case means.

13. A recording a reproducing apparatus comprising:
    a frame formed of a synthetic resin material and PBT resin to form a polymer alloy;
    carriage means supported by the frame for displacement with respect to the frame;
    rotating means mounted on the frame, the rotating means for rotating a recording medium;
    driving means mounted on the frame and operatively engaged with the carriage means for selectively displacing the carriage means with respect to the frame; and
    signal converting means for receiving and supplying a signal to and from a recording medium mounted on the carriage means for movement with the carriage means, the carriage means and signal converting means adapted to move freely in the radial direction of the rotating recording medium so as to access the entire surface of the recording medium.

14. The recording and reproducing apparatus of claim 13 wherein the PBT resin and synthetic resin are present between about 20% to 50% by weight.

15. A recording and reproducing apparatus, comprising:
    a substantially planar shaped frame;
    carriage means supported by the frame for displacement with respect to the frame;
    rotating means mounted on the frame, the rotating means for rotating a recording medium;
    driving means mounted on the frame and operatively engaged to the carriage means for selectively displacing the carriage means with respect to the frame;
    signal converting means for receiving and supplying a signal to and from a recording medium mounted on the carriage means for movement with the carriage means, the carriage means and signal converting means adapted to move freely in the radial direction of the rotating medium so as to access the entire surface of the recording medium; and two elongated side-frames mounted to opposite sides of the frame, the side-frames formed of a deformable material and each of the side-frames have a configuration for providing a large elasticity in the direction of the plane of the frame and small elasticity in a direction perpendicular to the plane of the frame, and at least one of the side-frames coupled to the frame at substantially the center of the frame.

16. The recording and reproducing apparatus of claim 15, wherein the frame is formed of a synthetic resin.

17. The recording and reproducing apparatus of claim 16, wherein one of the side-frames is rotatably coupled to that frame.

18. The recording and reproducing apparatus of claim 16, wherein one of the side-frames includes displacement regulating means for regulating the displacement of the frame with respect to that side-frame by a predetermined amount.

19. The recording and reproducing apparatus of claim 16, wherein one of the side-frames is joined to the frame in a configuration to increase the rigidity of the side-frame and frame.

20. The recording and reproducing apparatus of claim 16, wherein the frame is enclosed by case means including electrostatic shielding material for substantially surrounding the frame.

21. The recording and reproducing apparatus of claim 20, wherein the case means includes a shielding material shaped into an enclosure with the ends of the shielding material bonded to each other.

22. The recording and reproducing apparatus of claim 16, wherein the frame includes slits in the region where the frame is joined to the side-frame members.

23. A recording and reproducing apparatus, comprising:
a frame formed of a synthetic resin material and including 20% to 65% by weight glass fiber;
carriage means supported by the frame for displacement with respect to the frame;
rotating means mounted on the frame, the rotating means for rotating a recording medium;
driving means mounted on the frame and operatively engaged to the carriage means for selectively displacing the carriage means with respect to the frame; and
signal converting means for receiving and supplying a signal to and from a recording medium mounted on the carriage means for movement with the carriage means, the carriage means and signal converting means adapted to move freely in the radial direction of the rotating recording medium so as to access the entire surface of the recording medium.

24. The recording and reproducing apparatus of claim 23, wherein the thermal expansion coefficient of the frame is substantially equal to the thermal expansion coefficient of the recording medium.

25. The recording and reproducing apparatus of claim 23, wherein
the rotating means is secured to the frame at two positions such that a straight line connecting the two positions is substantially orthogonal to the direction of movement of the carriage means.

26. The recording and reproducing apparatus of claim 23, wherein
the driving means includes a motor and transmission means for transmitting rotational output of the motor to linear displacement of the carriage means.

27. The recording and reproducing apparatus of claim 26, wherein the transmission means includes a pinion driven by the motor and a rack mounted on the carriage means, the pinion in engagement with the rack.

28. The recording and reproducing apparatus of claim 26, wherein the transmission means includes a lead screw mounted on and driven by the motor and a lead pin mounted on the carriage means for following the rotation of the lead screw for moving the carriage means.

29. The recording and reproducing apparatus of claim 26, wherein the surface of the frame to which the motor is mounted is formed with a mounting aperture, the interior wall of the mounting aperture having at least two inwardly facing elastically deformable projections for supporting the motor.

30. The recording and reproducing apparatus of claim 26, wherein an elastic friction member is disposed between the motor and the frame to secure the motor to the frame.

31. The recording and reproducing apparatus of claim 26, wherein the drive means is bonded by adhesive to the frame.

32. The recording and reproducing apparatus of claim 23, wherein the frame is electrically conductive.

33. The recording and reproducing apparatus of claim 23, wherein the frame material includes carbon fibers.

34. A recording and reproducing apparatus, comprising:
a frame formed of a synthetic resin material including about 5 wt% to 35 wt% glass fibers and 5 wt% to 35 wt% carbon fibers;
carriage means supported by the frame for displacement with respect to the frame;
rotating means mounted on the frame, the rotating means for rotating a recording medium;
driving means mounted on the frame and operatively engaged to the carriage means for selectively displacing the carriage means with respect to the frame; and
signal converting means for receiving and supplying a signal to and from a recording medium mounted on the carriage means for movement with the carriage means, the carriage means and signal converting means adapted to move freely in the radial direction of the rotating recording medium so as to access the entire surface of the recording medium.

35. A recording and reproducing apparatus, comprising:
a frame formed of synthetic resin material having a mounting surface formed to define a mounting aperture having an interior wall and at least two inwardly facing elastically deformable projections;
carriage means mounted on the frame for displacement with respect to the frame;
rotating means mounted on the frame, the rotating means for rotating a recording medium;
driving means mounted on the mounting surface of the frame and operatively engaged to the carriage means for selectively displacing the carriage means with respect to the frame, the driving means including a motor supported by the deformable projections and transmission means for transmitting rotational output of the motor to linear displacement of the carriage means; and signal converting means for receiving and supplying a signal to and from a recording medium mounted on the carriage means for movement with the carriage means, the carriage means and signal converting means adapted to move freely in the radial direction of the rotating recording medium so as to access the entire surface of the recording medium.

36. A recording and reproducing apparatus, comprising:

a frame formed of synthetic resin material having a mounting surface;

carriage means supported by the frame for displacement with respect to the frame;

rotating means mounted on the frame, the rotating means for rotating a recording medium;

driving means mounted on the mounting surface of the frame and operatively engaged to the carriage means for selectively displacing the carriage means with respect to the frame, the driving means including a motor and transmission means for transmitting rotational output of the motor to linear displacement of the carriage means and an elastic friction member is disposed between the motor and the frame to secure the motor to the frame; and signal converting means for receiving and supplying a signal to and from a recording medium mounted on the carriage means for movement with the carriage means, the carriage means and signal converting means adapted to move freely in the radial direction of the rotating recording medium so as to access the entire surface of the recording medium.

37. The recording and reproducing apparatus of claim 36, wherein the thermal expansion coefficient of the frame is substantially equal to the thermal expansion coefficient of the recording medium.

38. The recording and reproducing apparatus of claim 36, wherein the frame is electrically conductive.

39. The recording and reproducing apparatus of claim 36, including case means including electrostatic shielding material for enclosing the frame.

* * * * *